US011272143B2

(12) United States Patent
Gage et al.

(10) Patent No.: US 11,272,143 B2
(45) Date of Patent: Mar. 8, 2022

(54) OPTICALLY VERIFIED WEATHER CONDITION DETECTION SYSTEMS, METHODS AND VEHICLES INCLUDING SAME

(71) Applicant: Toyota Motor Engineering & Manufacturing North America, Inc., Erlanger, KY (US)

(72) Inventors: Sergei I Gage, Redford, MI (US); Arata Sato, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 1007 days.

(21) Appl. No.: 15/248,048

(22) Filed: Aug. 26, 2016

(65) Prior Publication Data

US 2018/0063487 A1 Mar. 1, 2018

(51) Int. Cl.
*H04N 7/18* (2006.01)
*G01S 13/95* (2006.01)
*G08G 1/0967* (2006.01)
*G01W 1/00* (2006.01)

(52) U.S. Cl.
CPC ............ *H04N 7/183* (2013.01); *G01S 13/95* (2013.01); *G01W 1/00* (2013.01); *G08G 1/09675* (2013.01); *G08G 1/096716* (2013.01); *G08G 1/096725* (2013.01); *G08G 1/096775* (2013.01); *G01S 13/956* (2013.01)

(58) Field of Classification Search
CPC ............ H04N 7/183; G08G 1/096766; G08G 1/096716; G08G 1/096725; G08G 1/09675; G08G 1/096775; H04L 67/12; G01S 13/95; G01S 13/956; G01W 1/00; Y02A 90/10
See application file for complete search history.

(56) References Cited

U.S. PATENT DOCUMENTS

| | | | |
|---|---|---|---|
| 7,439,849 B2 | 10/2008 | Kameyama | |
| 8,519,860 B2 | 8/2013 | Johnson et al. | |
| 8,588,821 B1 | 11/2013 | Hewinson | |
| 9,110,196 B2 * | 8/2015 | Urmson | G01S 7/4802 |
| 9,527,434 B2 * | 12/2016 | Nakashima | B60Q 1/085 |
| 9,896,089 B2 * | 2/2018 | Styles | B60W 40/02 |
| 9,959,771 B1 * | 5/2018 | Carlson | G08G 5/0039 |
| 10,239,518 B2 * | 3/2019 | Styles | B60W 30/00 |
| 10,486,586 B1 * | 11/2019 | Ghannam | B60Q 1/143 |
| 10,773,732 B1 * | 9/2020 | Alexander | G05D 1/0212 |
| 10,836,398 B2 * | 11/2020 | Leekin | G08G 1/097 |
| 10,876,855 B2 * | 12/2020 | Iwaasa | G01C 21/32 |
| 11,021,150 B2 * | 6/2021 | Abdar | B60W 10/20 |

(Continued)

FOREIGN PATENT DOCUMENTS

KR 20110019050 2/2011

*Primary Examiner* — James M Pontius
(74) *Attorney, Agent, or Firm* — Dinsmore & Shohl LLP

(57) ABSTRACT

A method of monitoring and verifying weather information using a weather condition detection system of a vehicle is provided. The method includes receiving weather information by a computing device within the vehicle. The weather information is verified locally at the vehicle using the computing device. Verifying the weather information includes optically verifying the weather information using a vehicle video system of the vehicle comprising a camera.

17 Claims, 5 Drawing Sheets

(56) References Cited

U.S. PATENT DOCUMENTS

| | | | |
|---|---|---|---|
| 2010/0063673 A1* | 3/2010 | Anderson | G05D 1/0287 701/29.2 |
| 2012/0277952 A1* | 11/2012 | MacNeille | G01C 21/3453 701/36 |
| 2012/0286052 A1 | 12/2012 | Atluri et al. | |
| 2014/0002277 A1* | 1/2014 | Fulger | G01C 21/3415 340/905 |
| 2015/0073695 A1 | 3/2015 | Groves et al. | |
| 2017/0032666 A1* | 2/2017 | Pretorius | G08G 1/017 |
| 2017/0132929 A1* | 5/2017 | Mays | G08G 1/161 |
| 2017/0274985 A1* | 9/2017 | Baca | B64C 13/16 |
| 2017/0291600 A1* | 10/2017 | Styles | G07C 5/0825 |
| 2018/0072414 A1* | 3/2018 | Cantrell | B64C 33/02 |
| 2018/0170363 A1* | 6/2018 | Styles | B60W 40/02 |

\* cited by examiner

OPTICALLY VERIFIED WEATHER CONDITION DETECTION SYSTEMS, METHODS AND VEHICLES INCLUDING SAME

TECHNICAL FIELD

The present specification generally relates to weather detection systems for vehicles and, more specifically, to optically verified weather condition detection systems, methods and vehicles including the same.

BACKGROUND

Vehicle systems may link to external devices, such as a cellular phone, to access information. This information may include weather information, for example, using a weather application provided by the external device. This weather information may then be displayed to vehicle occupants using, for example, a vehicle display. Such an arrangement can allow the weather information to be provided to the vehicle occupants in a hands-free fashion without a need to manually handle the external device. It may be the case, however, that the weather information does not match actual conditions outside the vehicle.

Accordingly, a need exists for weather condition detection systems that verify actual weather conditions occurring outside the vehicle.

SUMMARY

In one embodiment, a method of monitoring and verifying weather information using a weather condition detection system of a vehicle is provided. The method includes receiving weather information by a computing device within the vehicle. The weather information is verified locally at the vehicle using the computing device. Verifying the weather information includes optically verifying the weather information using a vehicle video system of the vehicle comprising a camera.

In another embodiment, a method of providing a weather notification to a vehicle user of a vehicle based on locally provided weather information by the vehicle is provided. The method includes receiving locally provided weather information by a computing device in the vehicle, the locally provided weather information comprising image data of a weather event provided using a vehicle video system of the vehicle. The weather notification is sent to the vehicle user based on the locally provided weather information.

In yet another embodiment, a vehicle includes a weather condition detection system including a communications module that connects to an external weather information providing system using a communications network. A vehicle video system includes a camera at the vehicle that generates locally provided weather information comprising image data. A computing module receives externally provided weather information from the external weather information providing system and the locally provided weather information from the vehicle video system. The computing module includes logic that verifies the externally provided weather information using the image data.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles and methods that utilize optically verified weather condition detection systems to provide a vehicle user weather information that can be used by the vehicle user and/or the vehicle itself to perform or initiate a vehicle function. The optically verified weather condition detection systems utilize weather information obtained from both an external weather information supplying system and an internal weather information providing system to convey verified weather information to the vehicle user and/or to initiate a vehicle function, such as activate an air conditioning system. In some embodiments, the vehicle may provide the verified weather information to an external device, such as a cellular phone, that can be accessed by the vehicle user. The vehicle user may then initiate a vehicle function using, for example, the external device based on the verified weather information.

Figure 1:
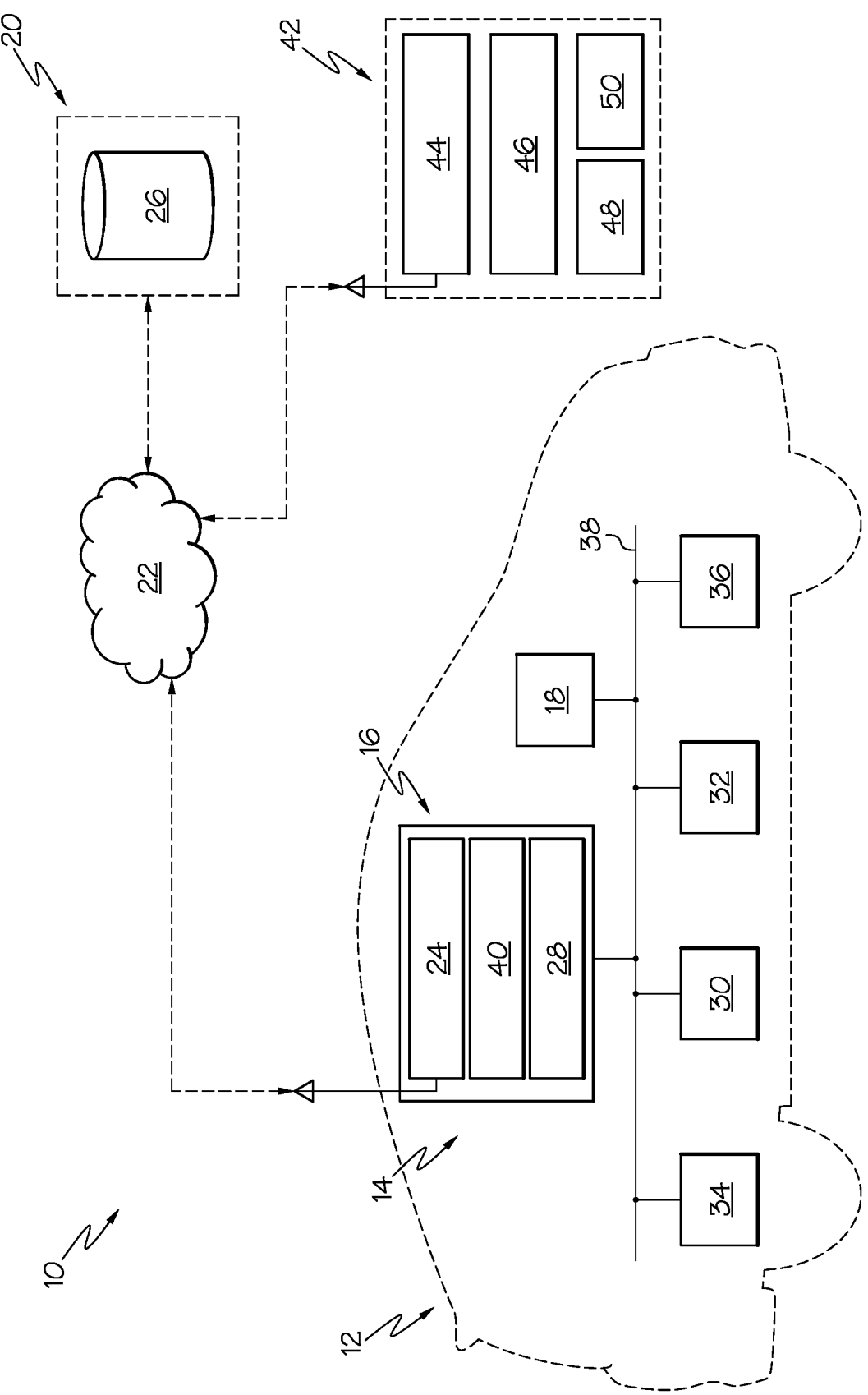
FIG. 1 is a diagrammatic view of a vehicle and weather condition detection system, according to one or more embodiments shown and described herein.

Referring to FIG. 1, an optically verified weather condition detection system 10 includes both external systems, which are systems that are and/or can be external to a vehicle (represented by dashed lines 20) and internal systems, which are systems that are internal and a part of the vehicle 12. The optically verified weather condition detection system 10 includes an internal weather information providing system, generally referred to as element 14 that can include a communications module 16, such as a data communications module (DCM) and a computing device 18. While the computing device 18 is illustrated as being external to the communications module 16, the computing device 18 may be part of the communications module 16.

The communications module 16 may be provided, at least in part, for communication with the external weather information providing system, generally referred to as element 20, through a communications network 22, such as the internet or a dedicated network. In some embodiments, the communications module 16 may connect directly to the internet using a cellular network or Wi-Fi, which can provide an "always on" configuration for sending and receiving information therefrom. In other embodiments, the communications module 16 may connect to the internet through a cellular device, such as a smart phone. For connecting with the communications network 22, the communications module 16 includes a communications control unit 24 that can send and receive information to and from a weather information server 26 of the external weather information providing system 20. The communications module 16 may also include a control unit 28 that can send and receive data to and/or from various vehicle electronic control units 30 and 32 (ECUs) via a communication line 38, such as a controller area network (CAN) line. For example, ECU 30 may send to and receive information from an HVAC system 34 of the vehicle 12, while ECU 32 may send to and receive information from a vehicle video system 36. Further, the communications module 16 may include a GPS unit 40, which can detect position of the vehicle 12 on the basis of radio waves from GPS satellites.

A user computing device 42 may connect to the internal weather information providing system 14 and the external weather information providing system 20 using the communications network 22. The user computing device 42 may include a communications control unit 44 that is a communication interface used to connect to the internal weather information providing system 14 and/or the external weather information providing system 20. The user computing device 42 may further include a display unit 46, a control unit 48 that includes a microprocessor and is adapted to execute communication protocols and various application programs and a memory 50, which can store various information, such as the application programs. As examples, the user computing device 42 may be a smart phone, tablet, laptop computer, desktop computer, smart watch, or any other suitable computing device.

As will be described in greater detail below, weather information may be provided from the external weather information providing system 20 to the computing device 18 using the communications module 16. The weather information provided by the external weather information providing system 20 may originate from any suitable source, for example, available over the internet such as any number of websites and data providers. The weather information may be in the form of weather radar data, weather forecast data, etc. Weather information may also be provided from the internal weather information providing system 14 to the computing device 18. The weather information provided by the internal weather information providing system 14 may originate from any suitable source, for example, from the vehicle video system 36. For example, the vehicle video system 36 may include a camera that can be used to monitor real-time conditions outside the vehicle 12 and relay the weather information to the computing device 18, which can be used to verify the weather information received from the external weather information providing system 20.

Figure 2:
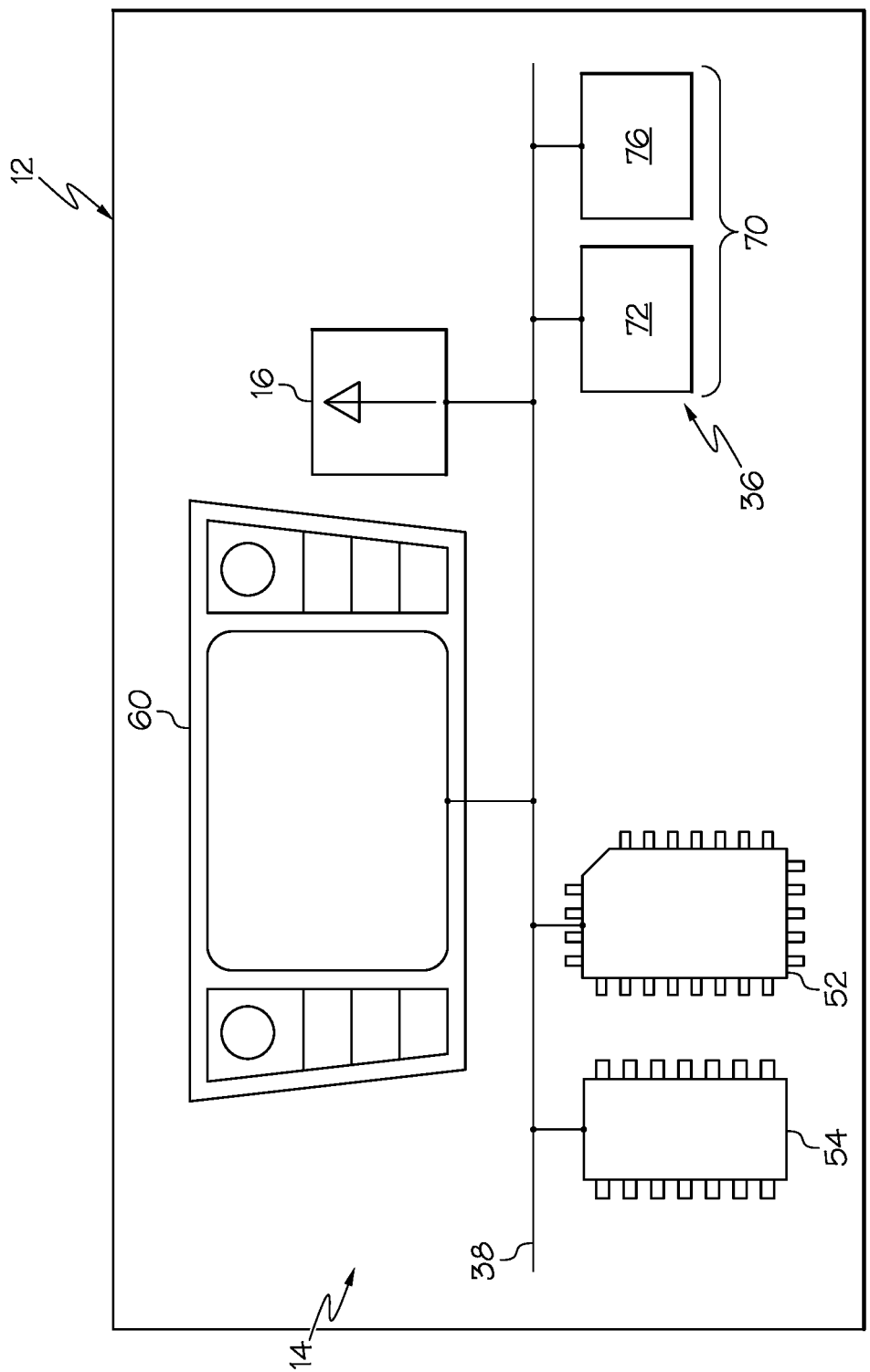
FIG. 2 depicts a communication path of the vehicle of FIG. 1, according to one or more embodiments shown and described herein.

Referring to FIG. 2, the vehicle 12 includes the internal weather information providing system 14 that utilizes one or more computing devices 18 (FIG. 1). The computing devices 18 can be any type of vehicle-installed (ECU), handheld, desktop, or other form of computing device, or can be composed of multiple computing devices. One or more processors 52 in the computing device 18 and elsewhere can be a single device, or multiple devices, capable of manipulating or processing information. Memory module 54 can be a random access memory device (RAM) or any other suitable type of storage device. The memory module 54 can include data that is accessed by the one or more processors 52 using the communication line 38. The memory module 54 can also include an operating system and installed applications, the installed applications including programs that permit the one or more processors 52 to perform various target object including weather detection methods.

The one or more processors 52 may be any device capable of executing machine readable instructions. The one or more processors 52 may be coupled to the communication line 38 that provides signal interconnectivity between various modules. Accordingly, the communication line 38 may communicatively couple any number of processors with one another, and allow the modules coupled to the communication line 38 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

The communication line 38 may be formed from any medium that is capable of transmitting a signal such as, for example, conductive wires, conductive traces, optical waveguides, or the like. In some embodiments, the communication line 38 may facilitate the transmission of wireless signals, such as WiFi, Bluetooth, and the like. Moreover, the communication line 38 may be formed from a combination of mediums capable of transmitting signals. In one embodiment, the communication line 38 comprises a combination of conductive traces, conductive wires, connectors, and buses that cooperate to permit the transmission of electrical data signals to components such as processors, memories, sensors, input devices, output devices, and communication devices. Accordingly, the communication line 38 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The internal weather information providing system 14 includes the one or more memory modules 54 coupled to the communication line 38. The one or more memory modules 54 may comprise RAM, ROM, flash memories, hard drives, or any device capable of storing machine readable instructions such that the machine readable instructions can be accessed by the one or more processors 52. The machine readable instructions may comprise logic or algorithm(s) written in any programming language of any generation (e.g., 1GL, 2GL, 3GL, 4GL, or 5GL) such as, for example, machine language that may be directly executed by the one or more processors 52, or assembly language, object-oriented programming (OOP), scripting languages, microcode, etc., that may be compiled or assembled into machine readable instructions and stored on the one or more memory modules 54. The machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any suitable computer programming language, as pre-programmed hardware elements, or as a combination of hardware and software components.

In some embodiments, the one or more memory modules 54 may include a database that includes navigation information and/or map information. However, it should be understood that other embodiments may not include navigation information and/or map information. Furthermore, the one or more memory modules 54 may include an image recognition database and algorithm to allow the object vehicle video system 36 to identify a target object type including snow, rain, sleet, hail and other weather events sensed within a vicinity of the vehicle 12.

The vehicle 12 includes a display 60 for providing visual output such as, for example, maps, navigation, entertainment, information, or a combination thereof. The display 60 may be coupled to the communication line 38, as shown in FIG. 2. Accordingly, the communication line 38 can communicatively couple the display 60 to other modules of the vehicle 12. The display 60 may include any medium capable of transmitting an optical output such as, for example, a cathode ray tube, light emitting diodes, a liquid crystal display, a plasma display, or the like. Moreover, the display 60 may be a touch screen that, in addition to providing optical information, detects the presence and location of a tactile input upon a surface of or adjacent to the display 60. Accordingly, the display 60 may receive mechanical input directly upon the optical output provided by the display 60. Additionally, it is noted that the display 60 can include at least one of the one or more processors 52 and the one or memory modules 54. The display 60 could be at least one of a heads-up display, an instrument cluster display, and a mobile device display. In some embodiments, the vehicle 12 may have a plurality of displays. In such embodiments, the vehicle 12 could also have a plurality of different types of displays. For example, and not as a limitation, the vehicle 12 could have an in-dashboard display and a heads-up display for displaying information directly on a windshield or other window of the vehicle 12.

The vehicle also includes the communications module 16 for communicatively coupling the vehicle 12 to the external weather information providing system 20. In some embodiments, the communications module 16 may communicatively couple the vehicle 12 to other vehicles, which may be referred to as vehicle-to-vehicle communication. The communications module 16 can be communicatively coupled to the communication line 38 and can be any device capable of transmitting and/or receiving data via a network. Accordingly, the communications module 16 can include a communication transceiver for sending and/or receiving any wired or wireless communication. For example, the communications module 16 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the communications module 16 includes hardware configured to operate in accordance with the Bluetooth wireless communication protocol. In another embodiment, communications module 16 may include a Bluetooth send/receive module for sending and receiving Bluetooth communications to/from the computing device 18 (FIG. 1).

The internal weather information providing system 14 may include one or more sensors 70 communicatively coupled to the one or more processors 52. The one or more sensors 70 may be used in conjunction with vehicle-to-vehicle communication or alone. The one or more sensors 70 can include, but are not limited to, cameras, LiDAR, RADAR, and proximity sensors. In some embodiments, multiple types of sensors 70 can be used to provide a variety of information to the computing device 18.

For instance, FIG. 2 illustrates the vehicle 12 utilizing a variety of sensors 70. A camera 72 may be coupled to the communication path 55 such that the communication line 38 communicatively couples the camera 72 to other modules of the vehicle 12. The camera 72 may be any device having an array of sensing devices capable of detecting radiation in an ultraviolet wavelength band, a visible light wavelength band, or an infrared wavelength band. The camera 72 may have any resolution. Suitable cameras may include, for example, a video camera, charge coupled device (CCD) camera, complementary metal-oxide-semiconductor (CMOS) camera, etc. Some embodiments may include multiple cameras. In operation, the camera 72 may be able to detect objects, such as precipitation or other weather-related objects within a vicinity of the vehicle 12. Further, the camera 72 and/or the one or more processors 52, based on input from the camera 72, may be able to determine one or more characteristics about the weather-related objects such as, for example, the type of weather event (rain, snow, sleet, hail, flooding, tornado, hurricane, etc.) and severity of the weather event through image recognition capabilities.

Still referring to FIG. 2, the vehicle 12 may further include other sensors represented by a second sensor 76 in addition to the camera 72. The second sensor 76 is coupled to the communication line 38 such that the communication line 38 communicatively couples the second sensor 76 to other modules of the vehicle 12. The second sensor 76 may be any device, for example, that can be used by the computing device 18 in verifying weather information. In some embodiments, the second sensor 76 may include RADAR, LiDAR, precipitation detectors, wind detectors, light detectors and/or the like. As described above, any sensor or combinations of sensors may be used to detect and monitor a weather event and used to verify weather information.

The one or more processors 52 may implement a method of monitoring and verifying weather information provided to the computing device 18 from the external weather information providing system 20 using weather information provided to the computing device 18 from the internal weather information providing system 14. In some embodiments, the method may be implemented as logic within the machine readable instructions stored in the one or more memory modules 54, that, when executed by the one or more processors 52. It is noted that, while the method may be described as following a specific sequence, additional embodiments of the present disclosure are not limited to any particular sequence.

Figure 3:
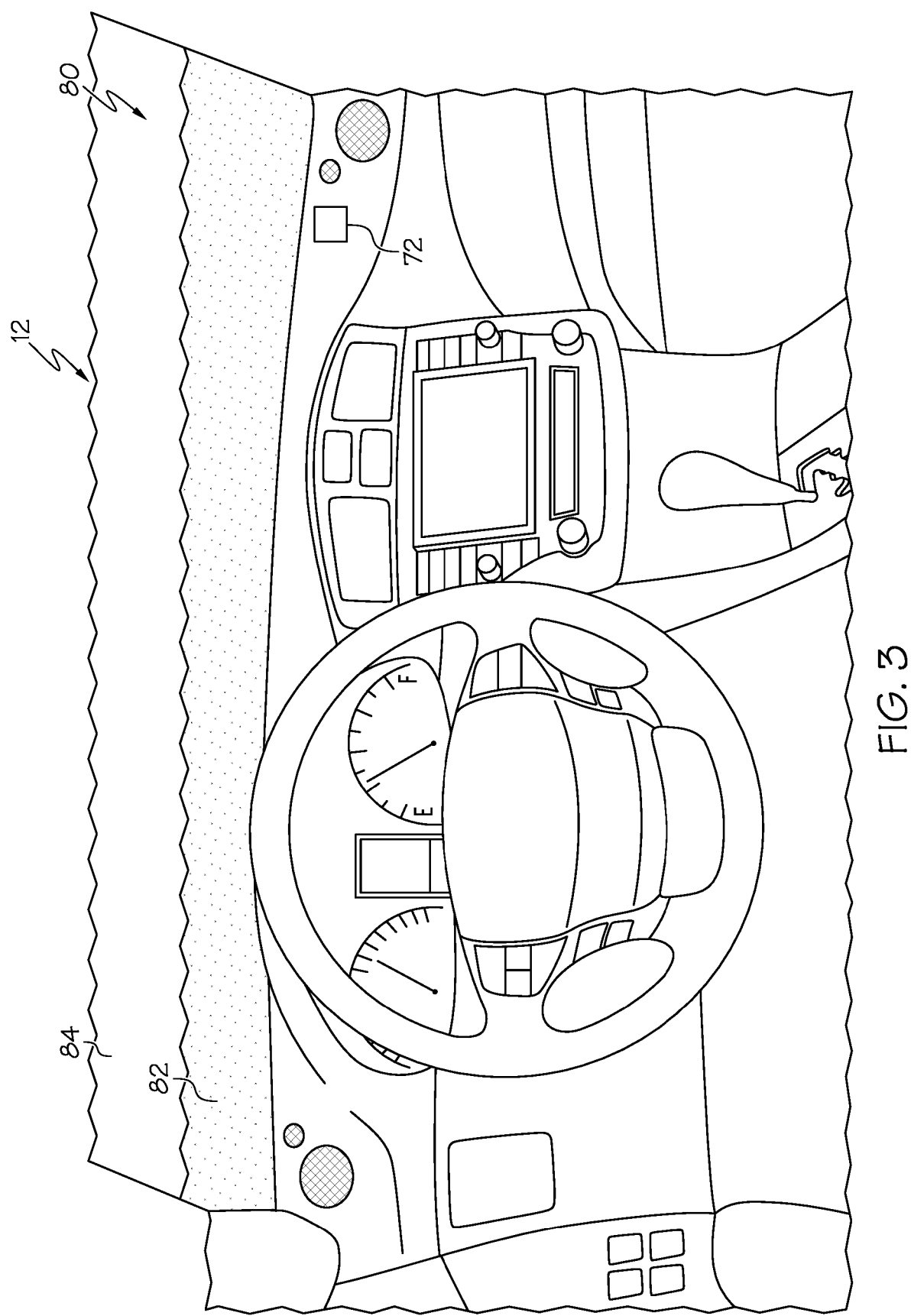
FIG. 3 depicts an interior of the vehicle of FIG. 1, according to one or more embodiments shown and described herein.

Referring briefly to FIG. 3, as an illustrative example, a forward view of an interior 80 of the vehicle 12 is illustrated. In this example, the vehicle 12 may be parked at a location where precipitation, such as snow 82 is present. As can be seen, the snow 82 may accumulate on a windshield 84 of the vehicle 12. The camera 72 is provided that can be used to monitor weather conditions outside of the vehicle 12. The camera 72 may monitor, for example, precipitation accumulation on the vehicle 12 and/or rate of falling precipitation. This weather information may be used, for example, by the computing device 18 to verify weather information provided by the external weather information providing system 20 to determine presence of a weather notification event.

Figure 4:
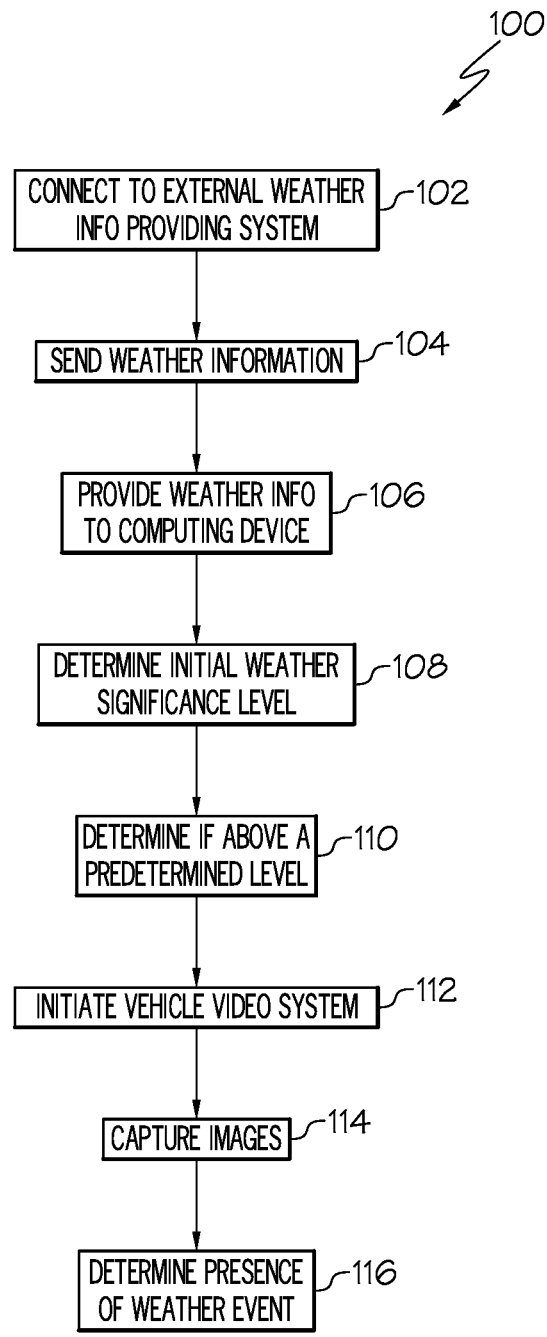
FIG. 4 illustrates a method of monitoring and verifying weather information, according to one or more embodiments shown and described herein.

FIG. 4 illustrates an exemplary a method 100 of monitoring and verifying weather information. At step 102, the communications module 16 connects to the external weather information providing system 20 through the communications network 22. In some embodiments, the communications module 16 may have an always-on configuration where the communications module 16 is connected to the external weather providing system 20 using, for example, a cellular network. The communications module 16 may also be Wi-Fi enabled to access the internet using Wi-Fi hotspot locations via a wireless local area network (WLAN) using a router connected to an internet service provider. In some embodiments, the communications module 16 may connect to the internet through a cellular device, such as a smart phone, tablet, or other internet enabled device.

Once the communications module 16 is connected to the communications network 22, the external weather information providing system 20 may send weather information provided by the weather information server 26 to the communications module 16 at step 104 using any suitable weather information providing source available, for example, over the internet. The weather information may be in the form of weather forecast data, weather radar data and current weather information, as examples. Such weather information provided from a remote (i.e., not local) source to the communications module 16 may be referred to herein as "remotely provided weather information." Of course, such remotely provided weather information may or may not be accurate at a particular vehicle location and at a particular time or over a particular period of time. In other words, remotely provided weather information may have a degree of uncertainty associated therewith as remotely provided current weather conditions may not be based on the collection of weather information locally. Thus, it may be desirable to provide increased certainty of an occurrence of a weather event before initiating a vehicle function in response to the weather event.

At step 106, the remotely provided current weather information is provided to the computing device 18. The computing device 18 may include logic within machine readable instructions that determines an initial weather significance level at step 108. The initial weather significance level may be based on one or more factors and may depend on the type of weather event, such as snowfall rates/accumulation, rainfall rates/accumulation, wind speed, lightning frequency, weather watches and warnings (e.g., tornado, thunderstorm, flooding, etc.), hail presence, ice accumulation and the like. At step 110, the computing device 18 determines if the initial weather significance level is above a predetermined initial weather significance level threshold (e.g., at least about 1 inch of snowfall accumulation, at least about 30 mph wind speed, a tornado watch for the location, etc.). If the computing device 18 determines that the initial weather significance level is below the predetermined initial weather significance level threshold, the computing device continues to monitor the remotely provided current weather information. If the computing device 18 determines that the initial weather significance level is above the predetermined weather significance level threshold, the computing device 18 instructs the ECU 32 (FIG. 1) to initiate the vehicle video system 36 and camera 72 at step 112.

The vehicle video system 36 may be used by the vehicle 12 to optically verify the remotely provided current weather information. For example, at step 114, the camera 72 captures images of regions outside the vehicle 12. The camera 72 may be any one or more of a front facing camera, a rear facing (back-up) camera, an external camera that is on an outside of the vehicle 12 and an internal camera that is in an interior of the vehicle 12. The image data may be processed, for example, by an image recognition program to determine whether and what type of weather event is currently present at step 116. In some embodiments, the image recognition program and image data may be used to determine presence of a weather event at step 116. In some embodiments, the image recognition program and image data may be used to determine a type of the weather event (e.g., snow, rain, hail, etc.). The image recognition program and image data may also be used to determine an actual weather significance level. For example, the image recognition program may be used to detect precipitation rates and accumulation by detecting or estimating droplets, flakes, etc. per unit area in an image and/or to detect snow and/or ice coverage on a window of the vehicle 12 and provide weather information indicative of actual weather significance level to the computing device. Such weather information provided from a local source to the communications module 16 may be referred to herein as "locally provided weather information." Based on the locally provided weather information, the communications module 16 may instruct one or more of the vehicle ECUs to initiate a vehicle function and/or some other function may be performed, such as provide a weather notification to the vehicle user.

The vehicle 12 may perform any suitable action based on the remotely and locally provided weather information. For example, the vehicle ECU may close one or more windows and a retractable roof of the vehicle 12 in response to rainfall and snowfall. The vehicle may activate the HVAC and defrost system in response to snowfall and ice. In some embodiments, the vehicle user may customize the actions taken by the vehicle based on the type and severity of the weather event.

Figure 5:
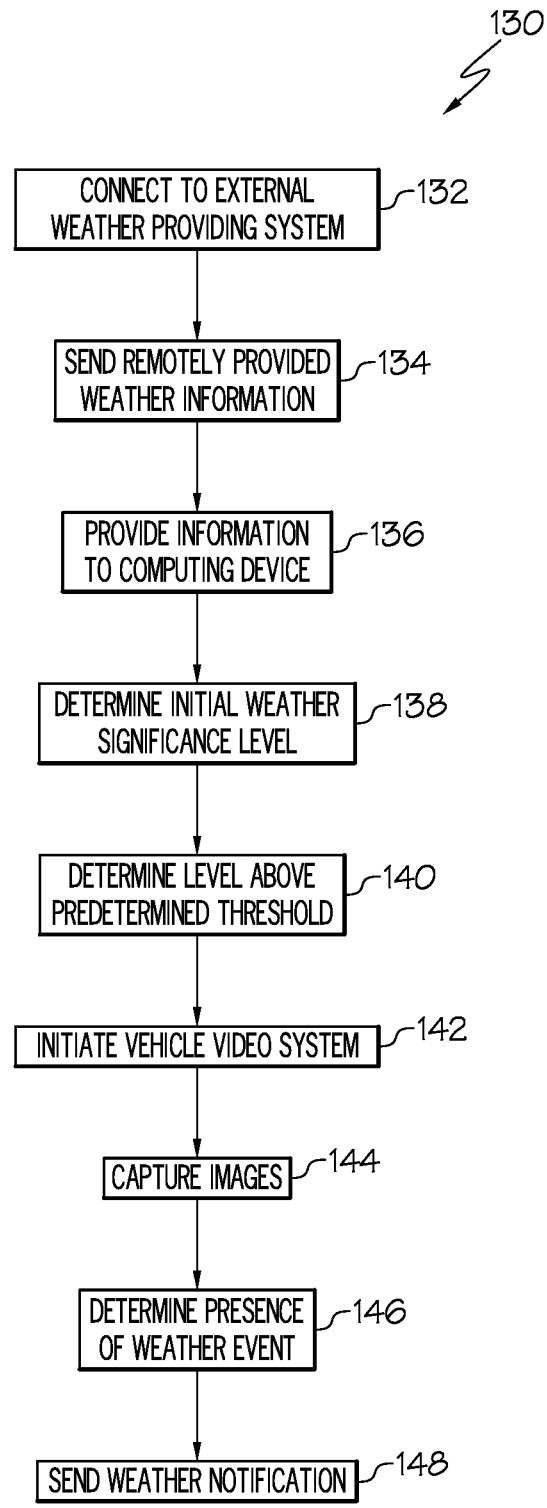
FIG. 5 illustrates a method of providing a weather notification to a vehicle user based on locally provided weather information, according to one or more embodiments shown and described herein.

Referring to FIG. 5, an illustrative method 130 of providing a weather notification to a vehicle user based on locally provided weather information is shown. At step 132, the communications module 16 connects to the external weather information providing system 20 through the communications network 22. In some embodiments, the communications module 16 may have an always-on configuration where the communications module 16 is connected to the external weather providing system 20 using, for example, a cellular network. The communications module 16 may also be Wi-Fi enabled to access the internet using Wi-Fi hotspot locations via a wireless local area network (WLAN) using a router connected to an internet service provider. In some embodiments, the communications module 16 may connect to the internet through a cellular device, such as a smart phone, tablet, or other internet enabled device.

The external weather information providing system 20 may then send remotely provided weather information provided by the weather information server 26 to the communications module 16 at step 134. The weather information may be in the form of weather forecast data, weather radar data and current weather information, as examples. At step 136, the remotely provided current weather information is provided to the computing device 18. The computing device 18 may include logic within machine readable instructions that determines an initial weather significance level at step 138. The initial weather significance level may be based on one or more factors and may depend on the type of weather event, such as snowfall rates/accumulation, rainfall rates/accumulation, wind speed, lightning frequency, weather watches and warnings (e.g., tornado, thunderstorm, flooding, etc.), hail presence, ice accumulation and the like. At step 140, the computing device 18 determines if the initial weather significance level is above a predetermined initial weather significance level threshold (e.g., at least about 1 inch of snowfall accumulation, at least about 30 mph wind speed, a tornado watch for the location, etc.). If the computing device 18 determines that the initial weather significance level is below the predetermined initial weather significance level threshold, the computing device continues to monitor the remotely provided current weather information. If the computing device 18 determines that the initial weather significance level is above the predetermined weather significance level threshold, the computing device 18 instructs the ECU 32 (FIG. 1) to initiate the vehicle video system 36 and camera 72 at step 142.

The vehicle video system 36 may be used by the vehicle 12 to optically verify the remotely provided current weather information. For example, at step 144, the camera 72 captures images of regions outside the vehicle 12. The camera 72 may be any one or more of a front facing camera, a rear facing (back-up) camera, an external camera that is on an outside of the vehicle 12 and an internal camera that is in an interior of the vehicle 12. The image data may be processed, for example, by an image recognition program to determine whether and what type of weather event is currently present at step 146, as described above. The image recognition program and image data may also be used to determine an actual weather significance level. For example, the image recognition program may be used to detect precipitation rates and accumulation by detecting or estimating droplets, flakes, etc. per unit area in an image and/or to detect snow and/or ice coverage on a window of the vehicle 12 and provide locally provided weather information indicative of actual weather significance level to the computing device.

Based on the locally provided weather information, the computing device 18 may initiate a weather notification that can be sent to the vehicle user using, for example, the communications module 16. The weather notification may be sent to the vehicle user at step 148 using any suitable process, such as a text message, email, cellular call, voicemail, as a notification through an application, etc. The weather notification can include information indicative of type of weather event, severity of weather event, recommended vehicle action steps, current vehicle status (e.g., windows down, engine ON, retractable top lowered, etc.). The vehicle user may then select a vehicle action based on the weather notification at step 150 using the user computing device 42 (FIG. 1).

The weather notification may be used by the vehicle user to set a vehicle action occurrence for a future time. As one illustrative example, the vehicle user may receive a weather notification from the vehicle 12 of snowfall at night. The vehicle user may select a vehicle action based on the weather notification to occur at some later time in the morning. For example, the vehicle user may select operation of the HVAC unit of the vehicle 12 to generate heat at a particular time to melt snow accumulating on the vehicle 12.

The above-described optically verified weather condition detection systems and methods can utilize both remotely provided weather information and locally provided weather information in order to take some vehicle action and/or provide a weather notification to a vehicle user. As opposed to relying solely on remotely provided weather information, which can have a certain unreliability, the vehicle can utilize locally provided weather information to verify the externally provided weather information before some action is taken or weather notification is sent to the vehicle user. Such an arrangement can reduce occurrences of unnecessary operation of vehicle systems. In some embodiments, the vehicle may use other sensor types other than a camera to verify the remotely provided weather information. In some embodiments, vehicle systems and weather notifications may be provided by the vehicle based solely on locally provided weather information. For example, a vehicle user may customize the optically verified weather condition detection system to provide a weather notification only upon optical detection of a weather event. In some embodiments, the local weather condition may be sensed by a vehicle sensor, such as a precipitation sensor and then verified locally using the camera and image recognition system.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of monitoring and verifying weather information using a weather condition detection system of a vehicle, the method comprising:
    receiving externally provided weather information as data from an external weather information providing system by a computing device within the vehicle;
    verifying the weather information locally at the vehicle using the computing device, wherein verifying the weather information includes optically verifying the weather information using a vehicle video system of the vehicle comprising a camera; and
    performing a vehicle function if the weather information is optically verified using the computing device.

2. The method of claim 1 further comprising connecting a communications module of the vehicle to the external weather information providing system.

3. The method of claim 1 comprising receiving internally provided weather information by the computing device from the vehicle video system.

4. The method of claim 3, wherein the internally provided weather information includes an image of a weather event.

5. The method of claim 1, determining an initial weather significance level by the computing device using the weather information.

6. The method of claim 5 further comprising activating the vehicle video system only if the initial weather significance level is at least a predetermined initial weather significance level.

7. The method of claim 6 further comprising determining an actual weather significance level using image data provided by the camera.

8. The method of claim 7 further comprising the vehicle performing a vehicle function only if the actual weather significance level is at least a predetermined actual weather significance level.

9. The method of claim 1, wherein the weather information is provided by a sensor of the vehicle other than the camera.

10. A method of providing a weather notification to a vehicle user of a vehicle based on locally provided weather information by the vehicle, the method comprising:
    receiving locally provided weather information by a computing device in the vehicle, the locally provided weather information comprising image data of a weather event provided using a vehicle video system of the vehicle;
    receiving externally provided weather information by the computing device from an external weather providing system;
    verifying the externally provided weather information locally at the vehicle using the locally provided weather information and the computing device; and
    sending the weather notification from the vehicle to the vehicle user based on the locally provided weather information and the externally provided weather information.

11. The method of claim 10, wherein the weather information comprises one or more of weather event type information and weather severity information.

12. The method of claim 10 further comprising connecting a communications module of the vehicle to the external weather information providing system.

13. The method of claim 10 further comprising determining an initial weather significance level by the computing device using the externally provided weather information.

14. A vehicle comprising a weather condition detection system, the vehicle comprising:
- a communications module that connects to an external weather information providing system using a communications network;
- a vehicle video system comprising a camera at the vehicle that generates locally provided weather information comprising image data; and
- a computing module that receives externally provided weather information from the external weather information providing system and the locally provided weather information from the vehicle video system, the computing module including logic that verifies the externally provided weather information using the image data and a vehicle function is performed if the weather information is optically verified using the computing module.

15. The vehicle of claim 14, wherein the computing module determines an initial weather significance level using the externally provided weather information.

16. The vehicle of claim 15, wherein the computing module activates the vehicle video system only if the initial weather significance level is at least a predetermined initial weather significance level.

17. The vehicle of claim 15, wherein the computing module determines an actual weather significance level using the image data provided by the camera.

* * * * *